United States Patent [19]

Sanford et al.

[11] 4,314,031
[45] Feb. 2, 1982

[54] TIN-PHOSPHORUS OXYFLUORIDE GLASSES

[75] Inventors: Leon M. Sanford, Painted Post; Paul A. Tick, Corning, both of N.Y.

[73] Assignee: Corning Glass Works, Corning, N.Y.

[21] Appl. No.: 160,387

[22] Filed: Jun. 17, 1980

[51] Int. Cl.$^3$ .................. C03C 3/04; C03C 3/10; C03C 3/12; C03C 3/00
[52] U.S. Cl. ..................... 501/44; 252/518; 501/42; 501/43; 501/45; 501/46; 501/73; 501/74; 501/901; 501/903; 501/25; 501/24; 501/32
[58] Field of Search .......... 106/47 Q, 47 R, 73.1, 106/48, 49; 423/618, 464, 301

[56] References Cited

U.S. PATENT DOCUMENTS

| | | | |
|---|---|---|---|
| 2,836,544 | 5/1958 | Nebergall | 106/47 R |
| 3,340,006 | 9/1967 | Mochel | 252/518 X |
| 4,049,779 | 9/1977 | Ropp | 106/47 R |
| 4,141,741 | 2/1979 | Lucas | 106/47 Q |
| 4,226,628 | 10/1980 | Bartholomew et al. | 106/47 R |

FOREIGN PATENT DOCUMENTS 627093  10/1978  U.S.S.R. ................. 106/53

Primary Examiner—Helen M. McCarthy
Attorney, Agent, or Firm—Kees van der Sterre

[57] ABSTRACT

Glass compositions in the tin-phosphorus-oxyfluoride composition system exhibiting very low glass transition temperatures and capable of being modified by the addition of selected constituents to exhibit excellent stability in a humid environment, are described.

5 Claims, 4 Drawing Figures

TIN-PHOSPHORUS OXYFLUORIDE GLASSES

BACKGROUND OF THE INVENTION

The present invention is in the field of glass composition and particularly relates to a new family of glasses wherein tin, phosphorus, oxygen and fluorine are essential constituents.

Among the known families of non-oxide glasses are the so-called halide glasses, consisting of amorphous products of the fusion of crystalline halides such as $BeF_2$, $ZrF_4$ and $ZnCl_2$. A description of the glass-forming characteristics observed in halide systems is provided by H. Rawson in "Inorganic Glass-Forming Systems", pp. 235-248, Academic Press, London, New York (1967).

As noted by Rawson, while $BeF_2$ and $ZnCl_4$ can form glasses alone, more complex glass compositions based on these and other fluoride glass-forming compounds have been developed for particular applications. Thus U.S. Pat. Nos. 2,466,507 and 2,466,509 to Sun and U.S. Pat. No. 2,466,506 to Sun and Callear disclose a number of multicomponent glass compositions based on $BeF_2$ and/or $AlF_3$ for use as optical glasses or the like.

SUMMARY OF THE INVENTION

The present invention encompasses a new field of glass composition founded upon the glass-forming behavior of stannous fluoride. Essential constituents of the composition system are tin, phosphorus, oxygen and fluorine, although other elements may be introduced to modify the properties of the resulting glasses. The glasses of the invention are referred to as oxyfluoride glasses, rather than as oxide or fluoride glasses, since both oxygen and fluorine are present in major proportions therein.

Broadly defined, glasses provided in accordance with the invention comprise, in weight percent on an elemental basis as calculated from the batch, about 20–85% Sn, 2–20% P, 3–20% O and 10–36% F. These constituents will normally make up at least about 75% by weight of the glass, with the remainder of the glass being made up of one or more other elements compatible with the glass forming composition. Examples of other elements which may be included in the glass in varying quantities depending upon compatibility are alkali metals such as Na, K and Li, alkaline earth metals such as Ca, Ba, and Mg, other Group II metals such as Zn and Cd, Group III elements such as La, Ce, B and Al, Group IV elements such as Pb, Zr, Ti, Si and Ge, Group V elements such as Sb and Nb, Group VI elements such as Mo and W, Group VII elements such as Cl, Br and I, and Group VIII metals such as Fe and Gd.

Batches formulated for glasses within the above-described composition region normally produce melts ranging from water white to strongly colored, typically at melting temperatures within the range of about 400°–450° C. These melts can be cast or otherwise formed into glass products which range in appearance from clear to strongly colored and/or opalized.

A particularly desirable characteristic of many of the glasses in the Sn-P-O-F system is a very low glass transition temperature, frequently in the region of 100° C. or below. Nevertheless, some of these very soft glasses exhibit remarkable resistance to attack by moisture at elevated temperatures, notwithstanding the very low softening temperatures thereof. Other properties which have been observed in glasses of this system are room temperature electrical resistivity values in the range of about $10^7$–$10^{11}$ ohm-cm, refractive index values in excess of 1.7, and thermal expansion coefficients in the neighborhood of $200 \times 10^{-7}$/°C.

Applications suggested by these properties and presently being considered are in the fields of optics and electronics. These glasses could be used to form molded optical elements, or to provide low-temperature glass-to-metal sealing for electronic circuit components such as capacitors.

BRIEF DESCRIPTION OF THE DRAWINGS

The invention may be further understood by reference to the drawings, wherein.

DETAILED DESCRIPTION

Figure 1:
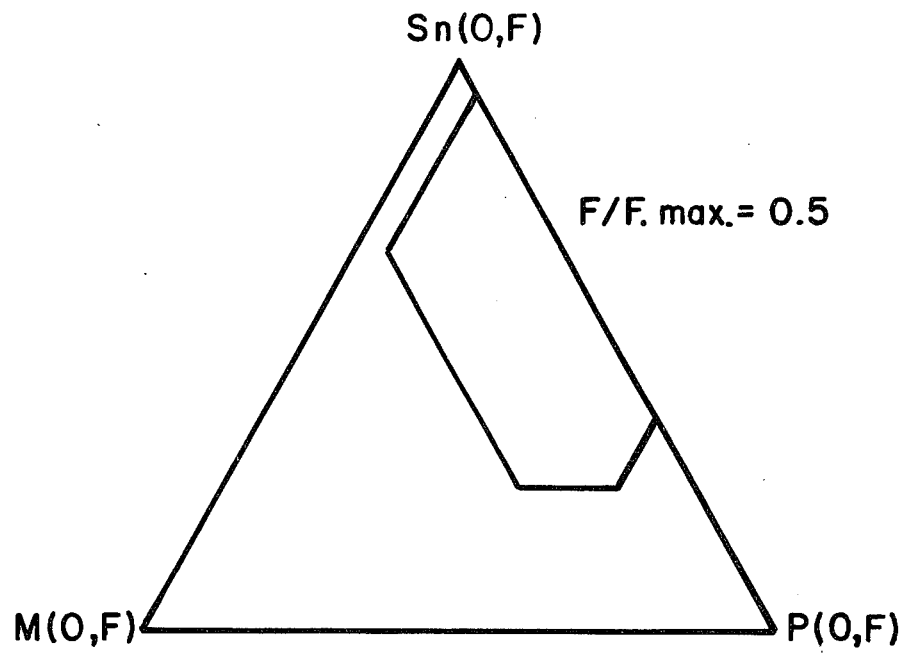
FIG. 1 plots a glass-forming region in the tin-phosphorous-cation modifier oxyfluoride composition system.

Glasses within the scope of the invention may be provided using as batch materials any of the compounds known in the glass-making arts for introducing the desired cationic and anionic constituents into the glass. Examples of suitable materials for formulating the base glass include $SnF_2$, $P_2O_5$, $Sn_3(PO_4)_2$, $SnO$, $NH_4H_2PO_4$, $NH_4PF_6$ and $Sn_2P_2O_7$. Optional cationic constituents may be introduced into the glass using oxides or, preferably, fluorides of the selected cations, and anionic constituents using, for example, halide salts. The selection of batch materials is not considered critical to the present invention.

Batches compounded from materials such as above described may be satisfactorily melted in crucibles fabricated of fused silica or 96% silica glass, and may be formed into glass articles by techniques such as casting, drawing, pressing or the like. Platinum or stainless steel melting units are not preferred because they are attacked in varying degrees by the molten glass, although nickel and nickel-based alloys are compatible with these compositions.

While a wide range of additives may be incorporated into the base glasses in varying amounts, depending upon the properties desired in the end product, compatibility with P-Sn-O-F glasses varies considerably depending upon the additives selected. These glasses are reducing in nature, tending to reduce to metal readily reducible metallic compounds. Thus Bi and Cu salts tend to produce metallic inclusions in these glasses, a result which would be undesirable for certain applications. Also, some batch materials such as $LaF_3$ and $SbF_3$ exhibit limited solubility and/or a low solution rate in the melt, limiting the quantity of these additives which can be practically incorporated into the glass.

The stability of these glasses is somewhat lower than that observed in more conventional oxide systems, such that in some cases the quantity of modifiers which can be introduced into the glass is limited by the tendency of the glass to phase-separate or devitrify. Ca, Zn, Cd, Mg, Ce, Gd and Al are examples of additives which most strongly reduce stability; these additives are normally used in only minor quantities. However, as with most glasses, the use of forming techniques which involve rapid cooling can aid considerably in obtaining haze-free glasses in the more highly modified composition regions.

The conventional glass-forming constituents $SiO_2$ and $B_2O_3$ constitute suitable sources of Si and B for the glass, these constituents being useful for modifying the temperature-viscosity characteristics thereof. A very significant feature of the composition system of the invention is that very soft (low transition temperature) glasses can be obtained without the presence of any alkali metals in the composition. Freedom from alkalis is one factor leading to the relatively high chemical durability of these glasses, and for applications where desirability is important, compositions such as above described which are essentially free of alkali metals will be preferred. Nevertheless, alkalis are compatible with glass forming in this system and Na, K and Li may be added in limited quantities where durability is not a prime consideration.

Among the more compatible additives in the tin phosphorus oxyfluoride composition system are Pb, Zr, Ti and Fe, with the most compatible known additive being Pb. The best combination of low temperature handling capability and desirable weathering characteristics to date has been exhibited by glasses in the Pb-P-Sn-O-F composition field.

A significant factor affecting glass-forming behavior in the glasses of the invention is the ratio of the fluorine content to the total anion content of the glass. For the purposes of the present description, the total anion content of a glass composition will be expressed in terms of the maximum possible fluorine content thereof (hereinafter sometimes referred to as the F-max. value), which is the fluorine content theoretically obtainable by replacing oxygen and any other optional anions in the glass with a stoichiometrically equivalent amount of fluorine. The ratio of actual fluorine concentration (F) to the maximum possible fluorine concentration (F-max.) in a particular glass is an approximate measure of the relative saturation of that glass in fluorine. Good glass-forming behavior in the P-Sn-O-F composition system appears to require that the ratio F:F-max. have a value in the range of about 0.2–0.8.

Some examples of glass compositions provided in accordance with the invention are set forth in Table I below. The compositions are reported in parts by weight on an elemental basis as calculated from the batch. Since the totals approximate 100, the reported values correspond roughly to concentrations in weight percent.

The compositions reported in Table I were prepared by melting the correspondingly numbered glass batch compositions reported in Table IA. The batches shown in Table IA were compounded from batch ingredients of at least commercial purity, and the batches were tumble-mixed prior to melting. Batch melting was carried out in covered 96% silica glass crucibles at temperatures in the range of 400°–450° C., with the molten glasses then being formed by casting as thin patties onto steel plates.

TABLE I

| Glass Compositions | | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Sn | 56 | 58.8 | 57.6 | 55.0 | 73.3 | 54.3 | 59.1 | 56.0 | 61.4 | 57.8 | 63.8 | 67.6 | 59.6 |
| P | 3.7 | 3.8 | 8.6 | 8.5 | 4.0 | 6.8 | 6.1 | 5.6 | 5.8 | 5.5 | 4.2 | 4.5 | 2.9 |
| Pb | 16.6 | 13.9 | | 2.7 | 1.8 | | | 12.2 | | | | | |
| Zr | | | | | | 8.2 | 6.1 | | | | | | |
| Ti | | | | | | | | | | | 2.6 | | |
| Li | | | | | | | | | | | | 0.3 | |
| Fe | | | | | | | | | | | | | 9.1 |
| F | 17.4 | 16.8 | 26.1 | 25.8 | 19.6 | 20.8 | 19.6 | 18.9 | 14.7 | 16.2 | 24.2 | 22.2 | 24.9 |
| I | | | | | | | | | | 7.5 | 14.1 | | |
| O | 5.9 | 6.4 | 7.7 | 7.8 | 6.3 | 9.5 | 9.0 | 7.0 | 6.9 | 6.5 | 4.9 | 5.2 | 3.4 |
| F/Fmax. | .515 | .50 | .515 | .582 | .561 | .45 | .45 | .57 | .41 | .37 | .71 | .68 | .79 |
| | 14 | 15 | 16 | 17 | 18 | 19 | 20 | 21 | 22 | 23 | 24 | 25 | 26 |
| Sn | 58.4 | 57.5 | 58.3 | 58.4 | 55.8 | 58.5 | 21.7 | 26.4 | 28.3 | 26.1 | 22.9 | 60.6 | 53.7 |
| P | 5.8 | 5.8 | 5.8 | 5.8 | 5.6 | 10.6 | 16.5 | 18.6 | 19.5 | 18.0 | 16.2 | 5.9 | 5.3 |
| Pb | 9.3 | 8.7 | 8.9 | 8.9 | 12.0 | | 10.7 | — | — | 6.5 | 11.2 | 12.4 | 21.8 |
| Zr | | | | 0.8 | | | | | | | | | |
| Ca | 0.7 | | | | | | | | | | | | |
| Ba | | 2.4 | | | | | 2.4 | | | | | | |
| Zn | | | 1.1 | | | | | | | | | | |
| Al | | | | | | | | 2.2 | 2.9 | 1.6 | 1.4 | 2.4 | |
| Si | | | | | | | | | | 0.4 | 0.3 | — | |
| F | 17.7 | 17.4 | 17.6 | 17.6 | 14.6 | 18.5 | 31.3 | 35.8 | 32.0 | 31.0 | 33.0 | 15.4 | 13.9 |
| Cl | | | | | 4.2 | | | | | | | | |
| O | 8.2 | 8.1 | 8.2 | 8.2 | 7.8 | 12.4 | 15.1 | 16.3 | 18.6 | 16.7 | 14.2 | 5.8 | 5.2 |
| F/F max. | .52 | .52 | .52 | .52 | .42 | .43 | .78 | .79 | .75 | .76 | .80 | .53 | .53 |

TABLE IA

| Batch Compositions | | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| $NH_4PF_6$ | | | 1.7 | 1.7 | | | | | | | | | |
| $NH_4H_2PO_4$ | 1.9 | 1.9 | 3.5 | 3.5 | 1.9 | 3.7 | 3.2 | 95 | 2.3 | 2.3 | 1.6 | 1.6 | 0.9 |
| $SnF_2$ | 8.4 | 8.2 | 11.3 | 11.0 | 10.7 | 8.4 | 8.6 | 400 | 8.3 | 7.8 | 8.9 | 8.9 | 6.7 |
| SnO | 1.8 | 2.2 | | | 1.2 | 1.9 | 2.2 | | | | | | 4.8 |
| $PbF_2$ | 2.8 | 2.3 | | 0.5 | 0.3 | | | 84 | | | | | |
| $ZrF_4$ | | | | | | 2.3 | 1.6 | | | | | | |

TABLE IA-continued

| Batch Compositions | | | | | | | | | | | | | |
|---|---|---|---|---|---|---|---|---|---|---|---|---|---|
| $Sn_2P_2O_7$ | | | | | | | | 37 | | | | | |
| $SnI_2$ | | | | | | | | | 1.2 | 2.4 | | | |
| $TiF_4$ | | | | | | | | | | | 0.7 | | |
| LiF | | | | | | | | | | | | 0.1 | |
| $FeF_2$ | | | | | | | | | | | | | 1.3 |

| | 14 | 15 | 16 | 17 | 18 | 19 | 20 | 21 | 22 | 23 | 24 | 25 | 26 |
|---|---|---|---|---|---|---|---|---|---|---|---|---|---|
| $P_2O_5$ | 70.9 | 70.9 | 70.9 | 70.9 | 70.9 | | 23.1 | 27.9 | 21.3 | 19.7 | 24.3 | | |
| $NH_4PF_6$ | | | | | | | 24.5 | 29.6 | 32.0 | 29.6 | 25.8 | | |
| $NH_4H_2PO_4$ | | | | | | 3.1 | | | | | | | |
| $SnF_2$ | 355 | 355 | 355 | 355 | 355 | 6.3 | 27.5 | 33.3 | 36.0 | 33.2 | 28.9 | 7.1 | 9.5 |
| SnO | 63 | 63 | 63 | 63 | 63 | | | | | | | | 0.4 |
| $PbF_2$ | 59 | 59 | 59 | 59 | | | 12.3 | | | 7.5 | 12.9 | 1.2 | 3.5 |
| $ZrF_4$ | | | | 8.4 | | | | | | | | | |
| $CaF_2$ | 7.8 | | | | | | | | | | | | |
| $BaF_2$ | | 17.5 | | | | | | | | | | | |
| $ZrF_2$ | | | 10.3 | | | | | | | | | | |
| PbCl | | | | | 94 | | | | | | | | |
| $Ba(PO_3)_2$ | | | | | | | 5.0 | | | | | | |
| $Al(PO_3)_2$ | | | | | | | | | 9.8 | 9.1 | | | |
| $SiO_2$ | | | | | | | | | 0.8 | 0.7 | | | |
| $AlF_3 \cdot H_2O$ | | | | | | | 7.5 | 9.5 | | | 7.9 | | |

The glasses reported in Tables I and IA above were examined and tested for softening characteristics, with certain of the glass articles also being tested for electrical resistivity, refractive index, and in a few cases weathering resistance. The results of this examination and testing are reported in Table II below. Table II includes a description of the appearance of each glass article, whether clear, hazy or smoky, with an indication of color, if present. The electrical resistivity values reported in Table II are direct current values obtained by testing at 23° C. The very low softening temperatures of these glasses are reflected by the low reported glass transition temperatures in Table II, which are the temperatures at which the glasses are deemed to be transformed from the solid to the liquid state, as determined by standard scanning calorimetry techniques.

relative humidity at 50° C., or in glass 24 after a 188-hour exposure under the same conditions.

From among the very low softening temperature glasses ($T_g \leq 100°$ C.), compositions 25 and 26 exhibited the best durability, having been exposed for 85 hours and 110 hours respectively at 40° C. under 92% relative humidity without evidencing surface attack. Glasses 1 and 2 exhibited minor surface attack after 24 hours under these conditions, while glasses 3 and 4, respectively, containing less Pb and having a relatively high F/F-max. value, were readily attacked in a short exposure interval. Glass 13, containing Li, could be dissolved in water.

Based on data such as set forth above, a particular field of glass composition within the P-Sn-O-F base glass system, optionally containing selected modifiers

TABLE II

| Glass Properties | | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Appearance | smoky | hazy | clear | clear | clear | clear | clear | smoky | clear yellow | clear yellow | clear yellow | clear | clear grey |
| Glass Transition Temp. (°C.) | 70 | 70 | 25 | 20 | 60 | 70 | 70 | | | | | | |
| Log Electrical Resistivity (ohm-cm) | 7.4 | 7.5 | 8.4 | 8.5 | | 10.6 | 9.4 | | | | | | |

| | 14 | 15 | 16 | 17 | 18 | 19 | 20 | 21 | 22 | 23 | 24 | 25 | 26 |
|---|---|---|---|---|---|---|---|---|---|---|---|---|---|
| Appearance | clear | slight haze | slight haze | clear | clear | clear | clear | clear | clear | clear | clear | clear | clear |
| Glass Transition Temp. (°C.) | | 92 | 90 | 88 | 88 | | 290 | 230 | 270 | 270 | 250 | 90 | |
| Log Electrical Resistivity (ohm-cm) | | | | | | | | | | | | | |
| Refractive Index | | | | | | | | 1.76 | 1.8 | | 1.775 | 1.75 | |

Weathering tests were conducted on some of the glasses reported in the above Tables, with results which depended strongly on composition. Consistent with the trend in conventional glass systems, compositions 23 and 24, which demonstrated relatively high glass transition temperatures ($T_g$), exhibited superior durability. No evidence of surface attack was discernable in glass 23 after a 144-hour exposure to an atmosphere of 98% for the purpose of adjusting glass properties, has been identified. That field comprises glasses consisting essentially, in weight percent on an elemental basis as calculated from the batch, of about 20-85% Sn, 2-20% P, 3-20% O, 10-36% F, 0-25% total of cation modifiers selected in the indicated proportions from the group consisting of: up to 25% Pb, up to 12% Zr, up to 10% Fe, up to 3% Ti, up to 1% Ca, up to 3% Ba, up to 2%

Zn, up to 12% total of Fe+Ti+Ca+Ba+Zn, up to 3% total of Na+Li+K, up to 4% Al, and up to 1% Si, and 0–20% total of anionic modifiers selected from the group consisting of Cl, Br and I.

A selected section of the above-disclosed composition field is illustrated in FIG. 1 of the drawing. FIG. 1 diagrams oxyfluoride glasses within the described composition field having F:F-max. ratios of 0.5, that is, half of the anion content of the glasses shown is made up of fluorine with the remainder consisting of oxygen. The ternary apex M(O,F) defines the direction of increasing concentration for cation oxyfluoride modifiers in the glass, wherein M is selected from the group of cation modifiers above disclosed and fluorine and oxygen are present in proportions providing an F/F-max. ratio of 0.5.

Figure 2:
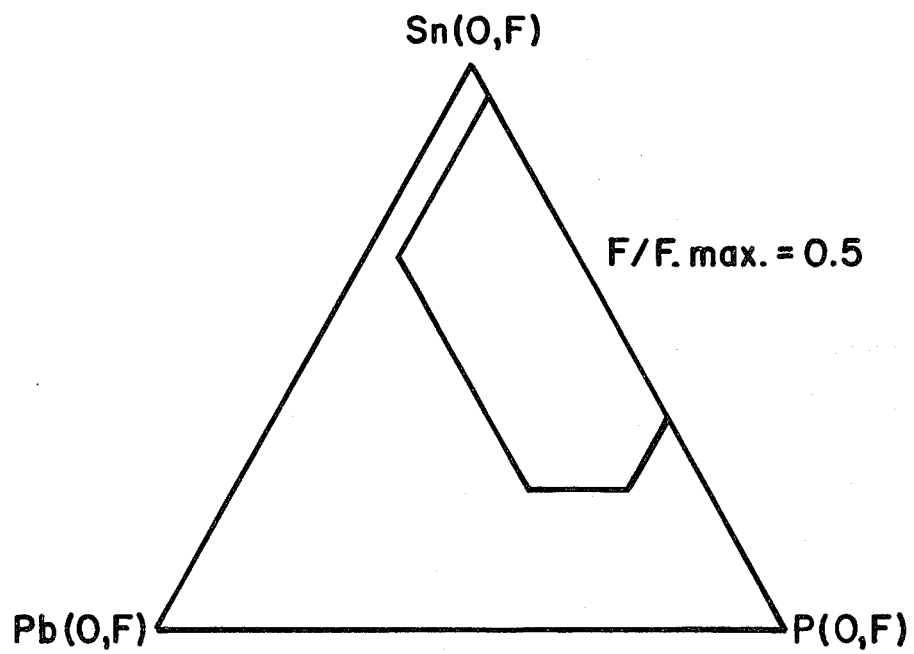
FIG. 2 plots a glass-forming region in the tin-phosphorous-lead oxyfluoride composition system.
Figure 3:
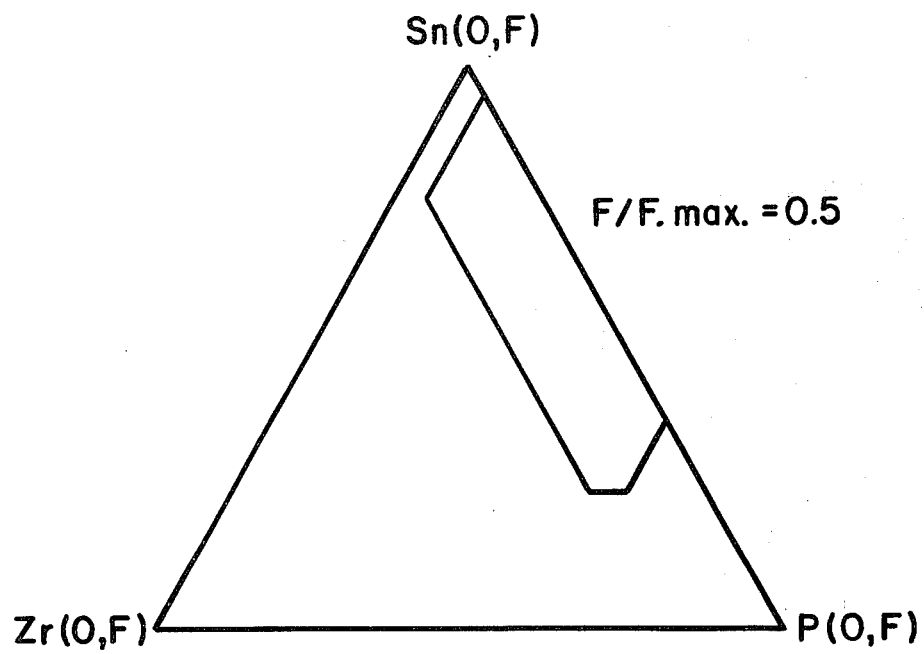
FIG. 3 plots a glass-forming region in the tin-phosphorous-zirconium oxyfluoride composition system.
Figure 4:
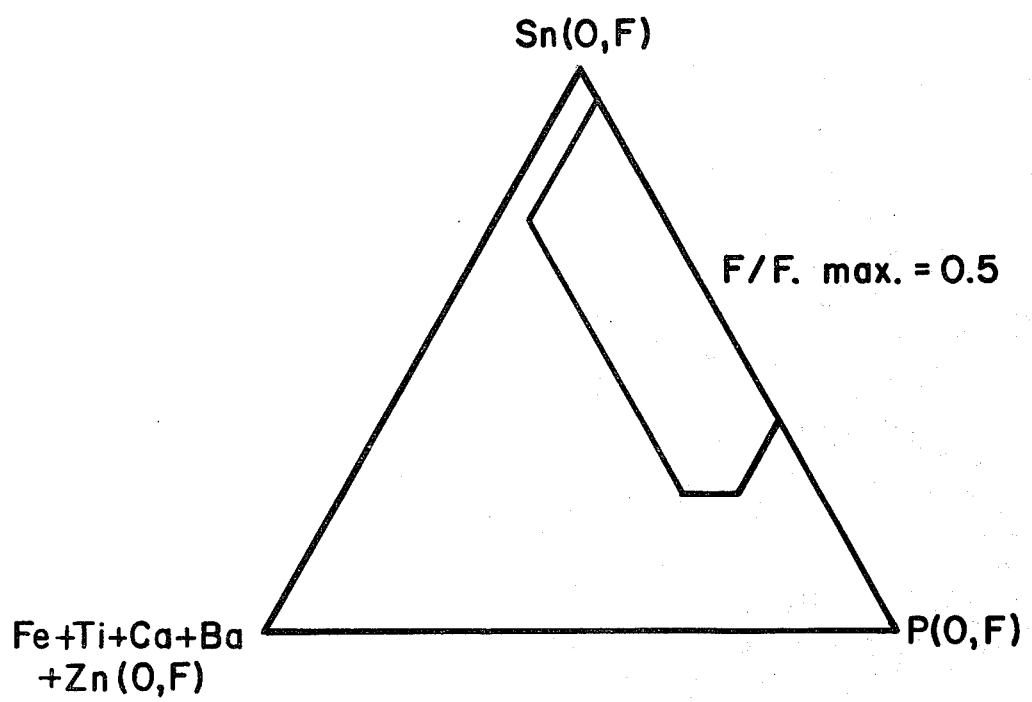
FIG. 4 plots a glass-forming region in the tin-phosphorous-modifier oxyfluoride composition system wherein the modifier is selected from Fe, Ti, Ca, Ba or Zn.

FIGS. 2–4 of the drawing are similar diagrams for glasses containing some preferred cation modifiers. Hence, FIG. 2 depicts selected Sn-P-Pb-O-F glasses, FIG. 3 depicts selected Sn-P-Zr-O-F glasses, and FIG. 4 depicts selected Sn-P-M-O-F glasses wherein M is Fe, Ti, Ca, Ba or Zn in the proportions specified above. Again, the diagrams show glasses wherein the F/F-max. ratio is 0.5.

Within the above-identified composition field, narrower composition ranges have been selected as defining glasses exhibiting particularly desirable or preferred properties for certain applications. Hence, glasses exhibiting a combination of very low glass transition temperature, good glass quality, and in some cases quite acceptable weatherability are those consisting essentially, in weight percent on an elemental basis as calculated from the batch, of about 50–75% Sn, 2–11% P, 4–13% O, 14–25% F, and 0–22% Pb, wherein the F/F-max. ratio is in the range of about 0.4–0.6.

A second group of compositions offering a good combination of softness, good glass quality and weatherability are those consisting essentially, in weight percent on an elemental basis as calculated from the batch, of about 50–75% Sn, 2–11% P, 4–13% O, 14–25% F, and 0–12% Zr, wherein the F/F-max. ratio is in the range of about 0.4–0.6.

For applications such as pressed optics wherein durability assumes higher importance and a somewhat higher glass transition temperature may be desirable, glass compositions consisting essentially, in weight percent on an elemental basis as calculated from the batch, of about 20–30% Sn, 15–20% P, 13–20% O, 30–36% F, 0–12% Pb, 0–3% Ba, 0–4% Al and 0–1% Si, wherein the F/F-max. ratio is in the range of about 0.7–0.8, are preferred.

Although the melting temperatures employed in preparing glasses such as above described are quite moderate in comparison with those customarily employed to melt oxide glasses, some volatilization of fluorine usually occurs on melting. Fluorine loss is variable but can range from 20 to as high 50% if steps are not taken to reduce losses. The use of minimum melting temperatures and covered crucibles will help to increase fluorine retention in the melt.

In the Pb-P-Sn-O-F glass-forming system, which includes some of the most durable glasses from among those exhibiting transition temperatures below 100° C., both appearance and durability appear to depend strongly on the F/F-max. ratio. As the ratio is decreased below about 0.5, the glasses take on a smokey appearance, with the intensity of color increasing as the fluorine content is reduced. Better durability is usually found in these lower ratio glasses, and glasses containing relatively high concentrations of Pb also exhibit enhanced durability.

As the F/F-max. ratio is increased in the Pb-P-Sn-O-F system, the glasses become clearer until, at ratio values of about 0.5–0.7, a water white region is reached. As the ratio is increased above this range, the glasses become less stable and devitrification tendencies become evident.

Of course, the foregoing examples are merely illustrative of glass compositions, methods and glass articles which could be provided in accordance with the invention, and numerous modifications and variations of those compositions, methods and articles may be resorted to within the scope of the appended claims.

We claim:

1. A glass comprising, in weight percent on an elemental basis as calculated from the batch, about 20–85% Sn, 2–20% P, 3–20% O, 10–36% F, and at least 75% total of Sn+P+O+F.

2. A glass consisting essentially, in weight percent on an elemental basis as calculated from the batch, of about 20–85% Sn, 2–20% P, 3–20% O, 10–36% F, 0–25% total of cation modifiers selected in the indicated proportions from the group consisting of: up to 25% Pb, up to 12% Zr, up to 10% Fe, up to 3% Ti, up to 1% Ca, up to 3% Ba, up to 2% Zn, up to 12% total of Fe+Ti+Ca+Ba+Zn, up to 3% total of Na+Li+K, up to 4% Al, and up to 1% Si, and 0–20% total of anion modifiers selected from the group consisting of Cl, Br and I.

3. A glass consisting essentially, in weight percent on an elemental basis as calculated from the batch, of about 50–75% Sn, 2–11% P, 4–13% O, 14–25% F, and 0–22% Pb, wherein the glass has an F/F-max. ratio in the range of about 0.4–0.6.

4. A glass consisting essentially, in weight percent on an elemental basis as calculated from the batch, of about 50–75% Sn, 2–11% P, 4–13% O, 14–25% F, and 0–12% Zr, wherein the glass has an F/F-max. ratio in the range of about 0.4–0.6.

5. A glass consisting essentially, in weight percent on an elemental basis as calculated from the batch, of about 20–30% Sn, 15–20% P, 13–20% O, 30–36% F, 0–12% Pb, 0–4% Al, 0–3% Ba, and 0–1% Si, wherein the glass has an F/F-max. ratio in the range of about 0.7–0.8.

* * * * *